(12) United States Patent
Handa

(10) Patent No.: US 11,379,143 B2
(45) Date of Patent: Jul. 5, 2022

(54) STORAGE SYSTEM AND COMPUTER SYSTEM

(71) Applicant: Hitachi, Ltd., Tokyo (JP)

(72) Inventor: Shunsuke Handa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/012,537

(22) Filed: Sep. 4, 2020

(65) Prior Publication Data

US 2021/0326046 A1  Oct. 21, 2021

(30) Foreign Application Priority Data

Apr. 15, 2020 (JP) .............................. JP2020-072668

(51) Int. Cl.
*G06F 3/06* (2006.01)
*G06F 9/455* (2018.01)
*G06F 21/56* (2013.01)

(52) U.S. Cl.
CPC ............ *G06F 3/065* (2013.01); *G06F 3/0619* (2013.01); *G06F 3/0665* (2013.01); *G06F 3/0673* (2013.01); *G06F 9/45558* (2013.01); *G06F 21/561* (2013.01); *G06F 2009/45583* (2013.01); *G06F 2221/034* (2013.01)

(58) Field of Classification Search
CPC ...... G06F 3/065; G06F 3/0619; G06F 3/0665; G06F 3/0673; G06F 9/45558; G06F 21/561; G06F 2009/45583; G06F 2221/034
See application file for complete search history.

(56) References Cited

U.S. PATENT DOCUMENTS

| | | | | |
|---|---|---|---|---|
| 7,752,669 | B2 * | 7/2010 | Palliyil | ............... H04L 63/1491 726/24 |
| 2008/0134335 | A1 * | 6/2008 | Kameda | .................. G06F 21/56 726/24 |
| 2008/0294859 | A1 * | 11/2008 | Nguyen | .............. G06F 11/1451 711/162 |
| 2014/0163953 | A1 * | 6/2014 | Parikh | ................... G06F 40/274 704/9 |
| 2019/0108157 | A1 * | 4/2019 | Nakagawa | ............ G06F 3/0611 |
| 2021/0014243 | A1 * | 1/2021 | Kulaga | ............... G06F 11/1464 |
| 2021/0019404 | A1 * | 1/2021 | Strogov | .............. G06F 11/1451 |

FOREIGN PATENT DOCUMENTS

JP  2015-153298 A  8/2015

* cited by examiner

*Primary Examiner* — Nanci N Wong
(74) *Attorney, Agent, or Firm* — Mattingly & Malur, PC

(57) ABSTRACT

Provided is a storage system in which a plurality of virtual volumes obtained by replicating a master virtual volume are provided to each of a plurality of virtual machines of a physical server, respectively, the storage system including: a snapshot management unit that configures a continuous scan generation from the plurality of virtual volumes; a selection processing unit that groups into at least one scan group on the basis of a duplication rate of the plurality of virtual volumes included in the continuous scan generation; and a path setting unit that collectively unmounts the plurality of virtual volumes belonging to the scan group from the physical server in a case where a replica of the virtual volume selected by the selection processing unit is attached to a virus scanning server and one of the plurality of virtual volumes belonging to the scan group is infected with virus.

9 Claims, 17 Drawing Sheets

FIG. 5

STORAGE SYSTEM MANAGEMENT
INFORMATION T50

| NAME | VALUE |
|---|---|
| SERVER | ID: 1<br>NICKNAME: Server1<br>PROTOCOL: FC<br>WWN: abcdefghijklmnop<br>MOUNT VOLUME ID/CONNECTION DESTINATION PORT/LUN:<br>100/A/0 |
| PORT | UNIQUE ID: A<br>PROTOCOL: FC<br>WWN: 1234567890123456 |
| VIRTUAL VOLUME | UNIQUE ID: 100<br>NICKNAME: Volume1<br>LUN: 0<br>CONNECTION DESTINATION SERVER ID: 1 |
| SNAPSHOT | REFER TO FIG. 7 |
| LUN | ID: 0<br>BELONGING PORT: A<br>CONNECTION DESTINATION VOLUME ID: 100 |
| CONTINUOUS SCAN GENERATION | REFER TO FIG. 6 |

CONTINUOUS SCAN GENERATION MANAGEMENT INFORMATION T60

| NAME | EXAMPLE OF VALUE |
|---|---|
| ID | 0 |
| MASTER VIRTUAL VOLUME | ID: 1 |
| SCAN TARGET VOLUME LIST | 100, 101, 102... |
| NUMBER OF VDIS (NUMBER OF VMS) | 500 |
| GENERATION INTERVAL | 12HOURS |
| MAXIMUM NUMBER OF RETAINED GENERATIONS | 90 (3MONTHS) |
| VIRUS SCANNING SERVER | ID: 1, 2, 3, 4, 5, 6, 7, 8, 9, 10 |
| QUARANTINE SERVER | ID: 11 |
| NUMBER OF VIRUS SCANNING DEVICES | 10 |
| VIRUS SCANNING TIME | 1 HOUR |
| SCAN GENERATION | REFER TO (4)-3 |
| SCAN GROUP | REFER TO (4)-4 |
| REFERENCE DUPLICATION RATE | 90% |
| WARNING DUPLICATION RATE THRESHOLD VALUE | 60% |

61 — ID
62 — MASTER VIRTUAL VOLUME
63 — SCAN TARGET VOLUME LIST
64 — NUMBER OF VDIS (NUMBER OF VMS)
65 — GENERATION INTERVAL
66 — MAXIMUM NUMBER OF RETAINED GENERATIONS
67 — VIRUS SCANNING SERVER
68 — QUARANTINE SERVER
69 — NUMBER OF VIRUS SCANNING DEVICES
610 — VIRUS SCANNING TIME
611 — SCAN GENERATION
612 — SCAN GROUP
613 — REFERENCE DUPLICATION RATE
614 — WARNING DUPLICATION RATE THRESHOLD VALUE

FIG. 7

| NAME | EXAMPLE OF VALUE |
|---|---|
| ID | 200 |
| CREATION SOURCE VOLUME ID | 100 |
| CREATION DATE/TIME | 2020-03-25T08:41:45.548Z |
| DIFFERENCE INFORMATION | POINTER TO VIRTUAL REGION WHERE DIFFERENCE DATA IS STORED |
| DIFFERENCE AMOUNT | 100MiB |

SNAPSHOT MANAGEMENT INFORMATION T70

SCAN GENERATION MANAGEMENT INFORMATION T80

| NAME | VALUE |
|---|---|
| ID | 0 |
| CREATION TIME | 2020-03-25T08:41:00.000Z |
| SCAN STARTED TIME | 2020-03-25T08:45:00.000Z |
| SCAN FINISHED TIME | 2020-03-26T06:00:00.000Z |
| NUMBER OF GROUPS | 120 |
| GROUP LIST | 0, 1, 2, 3, 4, 5, 6...119 |
| GROUPING DUPLICATION RATE | 85% |
| STATUS | NORMAL |

81 — ID
82 — CREATION TIME
83 — SCAN STARTED TIME
84 — SCAN FINISHED TIME
85 — NUMBER OF GROUPS
86 — GROUP LIST
87 — GROUPING DUPLICATION RATE
88 — STATUS

FIG. 9

SCAN GROUP MANAGEMENT INFORMATION T90

| NAME | VALUE |
|---|---|
| ID | 0 |
| STATUS OF GROUP | BEING EXECUTED |
| LIST OF BELONGING VOLUMES | 100, 120, 140, 150, 151 |
| DIFFERENCE AMOUNT OF EACH VOLUME | 100MiB, 2000MiB, 5MiB, 150MiB, 1000MiB |
| STATE OF EACH VOLUME | NORMAL, NORMAL, NORMAL, NORMAL, UNSCANNED |

91 — ID
92 — STATUS OF GROUP
93 — LIST OF BELONGING VOLUMES
94 — DIFFERENCE AMOUNT OF EACH VOLUME
95 — STATE OF EACH VOLUME

FIG. 10

DUPLICATED DATA MANAGEMENT INFORMATION T100

| DATA | V VOL A | V VOL B | V VOL C | V VOL D |
|------|---------|---------|---------|---------|
| 1001 | ○ | ○ | | |
| 1020 | ○ | ○ | | |
| 1021 | ○ | | ○ | ○ |
| 1031 | ○ | | ○ | ○ |
| 1032 | ○ | ○ | | |
| 1033 | | ○ | | ○ |
| ... | ... | ... | ... | ... |

1013　1014　1015　1016　1017

EXAMPLE OF SETTING SCREEN OF CONTINUOUS SCAN GENERATION MANAGEMENT INFORMATION

FIG. 16

MANAGEMENT SCREEN IMAGE
(SCAN GENERATION LIST)

| | Created Date | Status | Number Of Groups | Grouping Threshold | ID |
|---|---|---|---|---|---|
| ○ | 2020/01/21 14:14:22 | Warning | 50 | 73% | 4 |
| ○ | 2020/01/20 12:14:22 | Normal | 50 | 75% | 3 |
| ○ | 2020/01/20 10:14:22 | Recovered | 48 | 70% | 2 |
| ○ | 2020/01/20 08:14:22 | Normal | 48 | 73% | 1 |

MANAGEMENT SCREEN IMAGE
(SCREEN OF DETAILS OF SCAN GENERATION + BELONGING SCAN GROUP LIST)

MANAGEMENT SCREEN IMAGE
(DETAILS OF SCAN GROUP + BELONGING VOLUME LIST)

STORAGE SYSTEM AND COMPUTER SYSTEM

CROSS-REFERENCE TO RELATED APPLICATION

The present application claims priority from Japanese application JP 2020-072668, filed on Apr. 15, 2020, the contents of which is hereby incorporated by reference into this application.

BACKGROUND OF THE INVENTION

1. Field of the Invention

The present invention relates to a storage system, and more particularly, to a public technology that enables efficient execution of virus scanning.

2. Description of the Related Art

In a virtualization environment, a plurality of virtual servers are operating on one physical server. In this environment, the plurality of virtual servers share a network interface card (NIC), a memory, and the like of the physical server. For this reason, in a case where one virtual server is infected with virus, as compared with the environment of a normal physical server that is not virtualized, the possibility of another virtual server being infected becomes high.

With the recent explosive spread of IaaS by cloud providers, the damage caused by the worldwide spread of infection of ransomware (wannacry) tends to increase, and the security awareness of a cloud business side or a company in which a virtual desktop infrastructure (VDI) environment is constructed on premises becomes very high.

In particular, in the case of a zero-day attack, since it is difficult to detect when malware invades, regular backup and scanning with the latest antivirus software are required.

There is cited JP 2015-153298 A as a technique of quickly and safely restoring a virtual server infected with virus.

A restoration device described in JP 2015-153298 A described above includes an acquiring means for acquiring an snapshot from update information of a virtual disk storing means that stores a virtual disk of a virtual machine and storing the snapshot in a management information storing means, an updating means for storing an updated virus check file in the management information storing means after acquiring the snapshot, a checking means for executing virus checking of contents of the virtual disk restored on the basis of the snapshot by using the updated virus check file, and a restoring means for storing contents of the virtual disk restored on the basis of the snapshot determined not to be infected by the virus checking in the virtual disk storing means if the virtual machine is detected to be infected.

However, in JP 2015-153298 A described above, although a recovering means by the snapshot (generation management) is considered, in an environment in which a large amount of VDIs can be prepared at a high speed by using the replication function on the storage side, the time required for the virus scanning is not taken into consideration.

Moreover, in JP 2015-153298 A described above, there is no mention of preventing the risk of spread of infection to other VMs during the virus checking from increasing because the virus checking takes time.

In a virtualization environment having a large amount of VDIs, performing the virus scanning on each VM side is inefficient, and thus, supporting the virus scanning on the storage side that provides the virtual volume for VDI leads to the reduction of operational cost for the security of the company side in which the VDI environment is constructed.

SUMMARY OF THE INVENTION

Therefore, an object of the present invention is to provide a storage system preventing spread of infection by collectively unmounting volumes having high similar infection risk in a case where a certain volume is infected.

In addition, another object of the present invention is to provide a storage system and a computer system capable of efficiently executing virus scanning from a volume having a high infection risk in a case where a large volume exists.

In order to solve the above problem, according to an aspect of the present invention, there is provided a storage system in which a plurality of virtual volumes obtained by replicating a master virtual volume are provided to each of a plurality of virtual machines of a physical server, respectively, the storage system including: a snapshot management unit that configures a continuous scan generation from the plurality of virtual volumes; a selection processing unit that groups into at least one scan group on the basis of a duplication rate of the plurality of virtual volumes included in the continuous scan generation; and a path setting unit that collectively unmounts the plurality of virtual volumes belonging to the scan group from the physical server in a case where a replica of the virtual volume selected by the selection processing unit is attached to a virus scanning server and one of the plurality of virtual volumes belonging to the scan group is infected with virus.

According to the present invention, it becomes possible to prevent spread of infection by collectively unmounting volumes having high similar infection risk in a case where a certain volume is infected.

In addition, according to the present invention, in a case where a large number of volumes exist, it becomes possible to efficiently execute virus scanning from a volume having a high infection risk.

BRIEF DESCRIPTION OF THE DRAWINGS

FIG. 5 is a diagram showing an example of storage system management information according to the embodiment;

FIG. 6 is a diagram showing an example of continuous scan generation management information according to the embodiment;

FIG. 7 is a diagram showing an example of snapshot management information according to the embodiment;

FIG. 8 is a diagram showing an example of scan generation management information according to the embodiment;

FIG. 9 is a diagram showing an example of scan group management information according to the embodiment;

FIG. 10 is a diagram showing an example of duplicated data management information according to the embodiment;

FIG. 16 is a diagram illustrating an example of a management screen displaying a scan generation list according to the embodiment;

FIG. 17 is a diagram illustrating an example of a management screen displaying detailed scan generation information according to the embodiment.

DETAILED DESCRIPTION OF THE PREFERRED EMBODIMENTS

Figure 1:
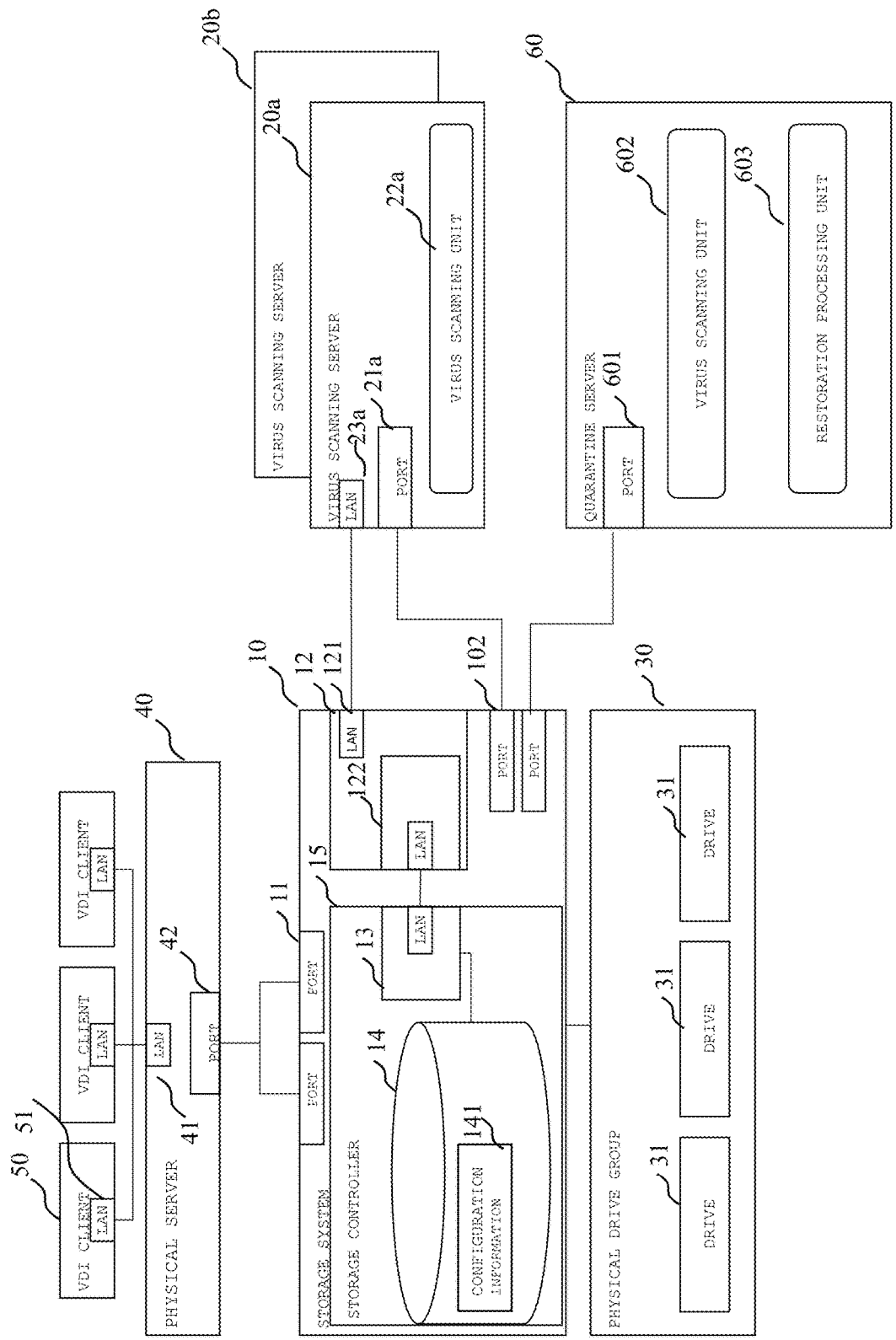
FIG. 1 is a diagram illustrating a configuration example of a distributed storage system according to an embodiment.

In the following description, a "memory" may typically be a main storage device. With respect to the memory, at least one memory may be a volatile memory or a non-volatile memory.

In addition, in the following description, the "storage device" is one or more PDEV and typically may be an auxiliary storage device. "PDEV" denotes a physical storage device and is typically a non-volatile storage device such as a hard disk drive (HDD) or a solid state drive (SSD).

In addition, in the following description, a "storage unit" is at least one (typically at least the memory unit) of the memory unit and the PDEV unit.

In addition, in the following description, a "processing unit" is one or more processors. The at least one processor is typically a microprocessor such as a central processing unit (CPU), but the at least one processor may be another type of processor such as a graphics processing unit (GPU). At least one processor may be single-core or multi-core.

In addition, the at least one processor may be a processor in a broad sense such as a hardware circuit (for example, a field-programmable gate array (FPGA) or an application specific integrated circuit (ASIC)) that performs a portion or all of the process.

In addition, in the following description, information may be expressed in a table format, but data of any structure may be used, or a learning model such as a neural network that generates an output for an input may be used.

In addition, in the following description, the information shown in the table format is an example, and one table may be divided into two or more tables, or all or a portion of the two or more tables may be one table.

In addition, in the following description, in some cases, a process may be described by using a function realized by a "program" as a subject. However, since a program is executed by a processing unit, and a predetermined process is appropriately performed by using a storage unit, an interface unit, and/or the like, the subject of the process may be the processing unit (or a device such as a controller having the processing unit).

The program may be installed in a device such as a computer or may be in, for example, a program distribution server or a computer-readable (for example, non-transitory) recording medium. In addition, in the following description, two or more programs may be realized as one program, and one program may be realized as two or more programs.

A physical server is one or more computers that issue I/O requests to a storage system, and one or more virtual computers (for example, a virtual machine (VM)) are executed in at least one physical computer. The virtual computer is a computer that issues an I/O request.

In addition, in the following description, an identification number is used as identification information of various targets. However, identification information (for example, an identifier including a letter or a code) of a type other than the identification number may be employed.

In addition, in the following description, in a case where the same types of elements are described without distinction, a reference numeral (or a common code in the reference numeral) may be used; and in a case where the same types of elements are described with distinction, identification numbers (or reference numbers) of the elements may be used.

EMBODIMENT

Hereinafter, embodiments will be described with reference to FIGS. 1 to 18.

FIG. 1 is a diagram illustrating a configuration example of a distributed storage system according to the embodiment.

The distributed storage system includes a storage system 10, a virus scanning server 20, a physical drive group 30, a physical server 40, a VDI client 50, and a quarantine server 60 and is connected via a network.

The storage system 10 has a storage controller 15 and writes a data in the physical drive group 30 or reads a data from the physical drive group 30 in response to an I/O request from the physical server 40 via storage ports 11.

A storage unit 14 of the storage controller 15 stores a correspondence relationship among volumes (virtual volumes) managed by the storage controller and provided to the physical server 40, pools for storing a data, and drives 31 of the physical drive group 30 constituting the pool as a configuration information 141.

A storage region from a pool is assigned to a virtual volume by using a so-called thin provisioning technology, and the virtual volume stores a data.

In thin provisioning, if data is written to an empty virtual volume having a virtual capacity, the entity is assigned from the pool to the relevant LBA region on the virtual volume in units of a page. The configuration information 141 has information for managing the correspondence relationship between the LBA of the virtual volume and the LBA of the pool in units of a page, and the storage controller updates this information. The pool is managed in units of a fixed length called a page, which are separated by, for example, several MBs.

A configuration information requesting unit 122 of a storage management device 12 requests the configuration of the storage system from a configuration information operation unit 13 of the storage controller 15. The configuration information operation unit 13 creates and manages virtual volumes, pools, or the like according to the request.

The storage management device 12 has a LAN interface 121 and is connected to the virus scanning server 20. In addition, the storage system 10 has a plurality of storage ports 11 and 102 and is connected to the physical server 40, the virus scanning server 20, and the quarantine server 60 via an FC or iSCSI network.

The physical server 40 is connected to a plurality of the VDI clients 50 and provides a plurality of virtual machines (VMs) that execute the processes of the plurality of VDI clients 50.

The virus scanning server 20 includes a virus scanning unit 22 that executes virus scanning of data stored in the virtual volume of the storage system 10. The virus scanning server 20 is connected to the storage management device 12 via a LAN interface 23 and is connected to the storage port 102 of the storage system 10 by a server unit port 21.

The quarantine server 60 has a virus scanning unit 602, a restoration processing unit 603 that executes virus scanning, and a server side port 601 for connecting to the storage system 10.

The physical drive group 30 includes a plurality of drives 31, and a logical storage device is configured from the plurality of drives 31 by the storage controller 15 by using a redundancy technique such as RAID. A storage region such as a pool is configured by the logical storage device.

The configuration information 141 includes pool information that manages the correspondence between pool addresses and drives, volume information that manages virtual volumes provided by the storage system 10, and the like.

Figure 2:
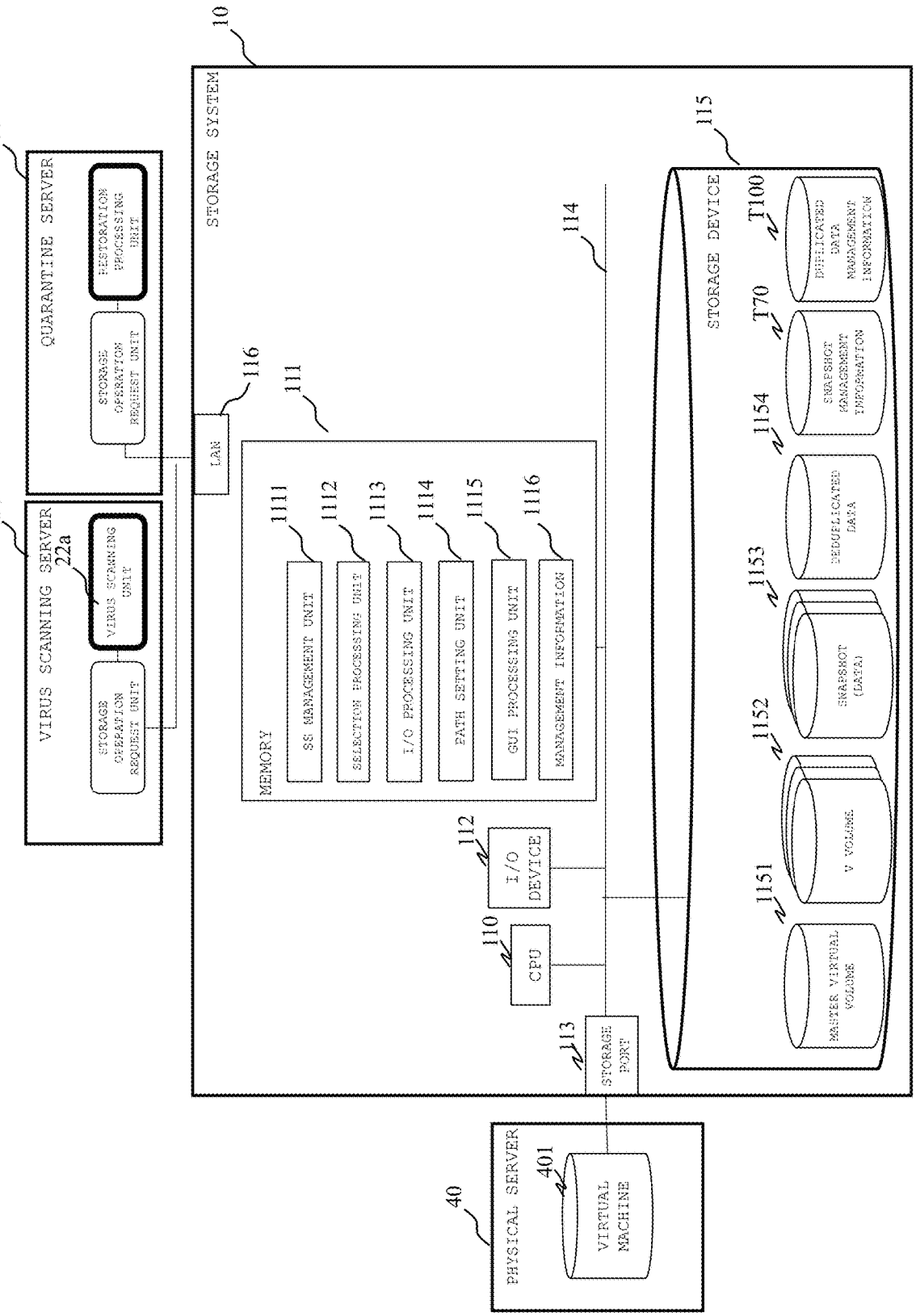
FIG. 2 is a diagram illustrating an example of a configuration diagram of a storage system according to the embodiment.

FIG. 2 is a diagram illustrating an example of a configuration diagram of the storage system according to the embodiment.

The storage system 10 includes a LAN port 116 that is a network interface, a storage port 113, a memory 111, a CPU 110 that is a processing unit, a storage device 115 such as an HDD or an SSD, an input/output device 112, and a connection device 114 such as a bus that connects the LAN port 116, the storage port 113, the memory 111, the CPU 110, the storage device 115, and the input/output device 112. The storage controller 15 may include at least the CPU 110 and the memory 111, and these components may have a redundant configuration. In addition, the storage controller 15 may include, as the memory 111, a shared memory that shares information with the redundant storage controller.

The memory 111 stores programs constituting a snapshot management unit (SS management unit 1111), a selection processing unit 1112, an I/O processing unit 1113, a path setting unit 1114, and a GUI processing unit 1115. Management information 1116 is also stored. In FIG. 2, the SS management unit 1111, the selection processing unit 1112, the I/O processing unit 1113, the path setting unit 1114, and the GUI processing unit 1115 are functionally described for easy understanding, but the CPU 110 executes the respective programs stored in the memory 111 to realize the respective functions of the SS management unit 1111, the selection processing unit 1112, the I/O processing unit 1113, the path setting unit 1114, the GUI processing unit 1115, and the like.

Before describing the SS management unit 1111, the selection processing unit 1112, the I/O processing unit 1113, the path setting unit 1114, and the GUI processing unit 1115, an outline of the operations of the embodiment will be described with reference to FIG. 3.

Figure 3:
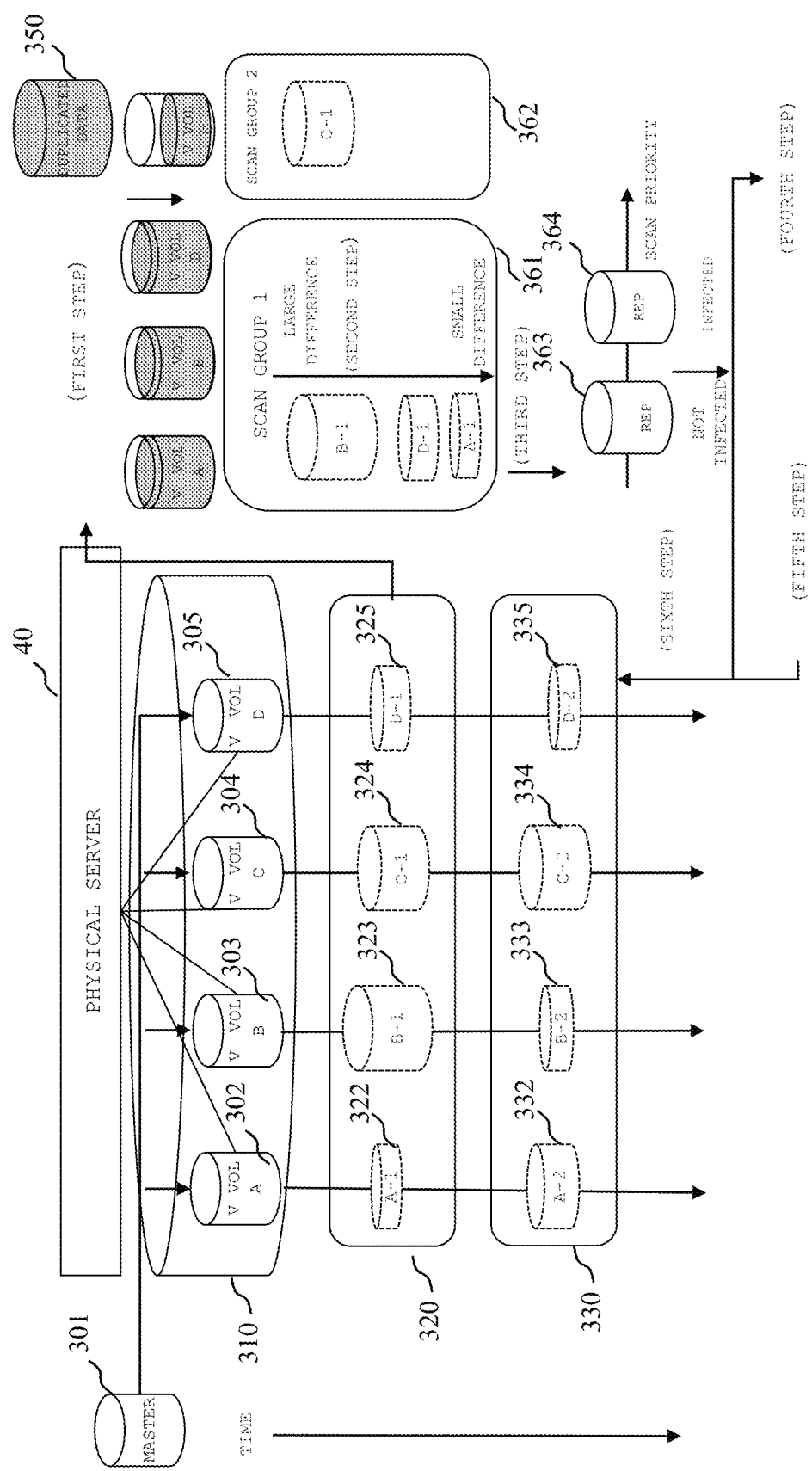
FIG. 3 is an explanatory diagram of a summary of the invention in a VDI environment according to the embodiment.

FIG. 3 is an explanatory diagram of a summary of the invention in the VDI environment according to the embodiment.

The SS management unit 1111 of the storage system 10 creates a plurality of replicas from the master virtual volume 301. The plurality of replicas are a virtual volume A 302, a virtual volume B 303, a virtual volume C 304, and a virtual volume D 305 and configure a continuous scan generation. The virtual volumes are depicted as V VOL in the drawings. Each replica is provided to the physical server 40 and can be used by the VDI client 50. In addition, in FIG. 3, the virtual volume A 302, the virtual volume B 303, the virtual volume C 304, and the virtual volume D 305 are associated with one pool of the storage system 10, and the deduplication function is set for the relevant pool. In this manner, a continuous scan generation 310 is configured with the virtual volume A 302, the virtual volume B 303, the virtual volume C 304, and the virtual volume D 305 that are replicated from the same master virtual volume 301 and are associated with the same pool in which the deduplication function is set. In addition, a plurality of continuous scan generations 310 may be configured for each physical server 40.

For example, snapshots are generated at predetermined intervals for the virtual volume A 302, the virtual volume B 303, the virtual volume C 304, and the virtual volume D 305. Assuming that the initial snapshot generation is set as the zeroth generation and the next snapshot generation is set as the first generation, the difference amounts (difference of the first generation) of the virtual volumes from the zeroth generation to the first generation are recognized as A-1 (322), B-1 (323), C-1 (324), and D-1 (325). The difference amount corresponds to the amount of a write data for each virtual volume between the zeroth generation and the first generation and constitutes the scan generation 320.

Similarly, the difference (difference of the second generation) between the respective virtual volumes from the first generation to the second generation is recognized as A-2 (332), B-2 (333), C-2 (334), or D-2 (335) and constitutes the scan generation 330. A-1 (322), B-1 (323), C-1 (324), D-1 (325), A-2 (332), B-2 (333), C-2 (334), and D-2 (335) are called the scan generation.

As a premise, assuming that there is a duplicated data 350 that is duplicated between the virtual volumes, an outline of the operations of the embodiment will be described.

(First step) Among the capacities of the respective virtual volumes, the virtual volume A 302, the virtual volume B 303, and the virtual volume D 305 which have a high occupation rate of the duplicated data 350 (duplicated data retention rate) are grouped into the scan group 1 (361).

Since the virtual volume C has a low duplicated data retention rate, the virtual volume C is managed as another scan group 2 (362).

(Second step) Sorting is performed in descending order of difference data within the grouped scan groups. FIG. 3 illustrates an example in which B-1 has the largest difference and A-1 has the smallest difference.

(Third step) A replica is created with the virtual volume having the largest difference amount in each scan group as a representative, and the representative virtual volumes 363 and 364 are created. The representative virtual volumes are depicted as REP in FIG. 3. The virus scanning is performed from the virtual volume having the largest difference amount between the representative virtual volumes of each scan group.

"Having a large difference amount" denotes that the write amount is large and the possibility of virus infection is high at a predetermined interval at which a snapshot is generated, and thus, the virus scanning is to be preferentially executed. In particular, attention has been paid to the fact that in ransomware and the like, since data are encrypted and rewritten, the write amount tends to increase.

In addition, in the scan group 1 having a plurality of virtual volumes, the scanning of the virtual volume D and the virtual volume A having a small difference amount can be omitted. For this reason, it is possible to shorten the scan time in a virtualization environment in which a virtual volume is provided for each of many VDIs.

(Fourth step) In a case where infection is found in the representative virtual volume in the third step, all the virtual volumes belonging to the scan group are forcibly unmounted from the physical server 40 and are allowed to be in a state of being inaccessible from the physical server 40. In FIG. 3, in a case where the virtual volume B corresponding to B-1 of the scan group 1 becomes the representative virtual volume 363, and infection is found in the virtual volume B, in addition to the virtual volume B, the other virtual volumes A and D belonging to the scan group 1 (361) are also unmounted from the physical server 40.

(Fifth step) In the fourth step, each volume is individually scanned in the unmounted virtual volume quarantine environment, and the infected virtual volume is restored and reattached to the physical server 40. In addition to the representative virtual volume B, in a case where the virtual volume A is also infected in the individual scanning, the representative virtual volume B and the virtual volume A are restored.

(Sixth step) The first to fifth steps are executed for the next scan generation. The process is executed for the scan generation 330.

As described above, in a case where virtual volumes having a high duplicated data retention rate are grouped together, and a volume in a scan group is infected, spread of infection is prevented by collectively unmounting volumes having high similar infection risk for each group.

In addition, the volumes of the scan target are narrowed and prioritized by using the duplicated data retention rate of virtual volumes and the difference amount of snapshots, in a case where a large number of volumes exist to correspond to a large number of VDIs, it is possible to efficiently execute virus scanning from a volume having a high infection risk.

Figure 4:
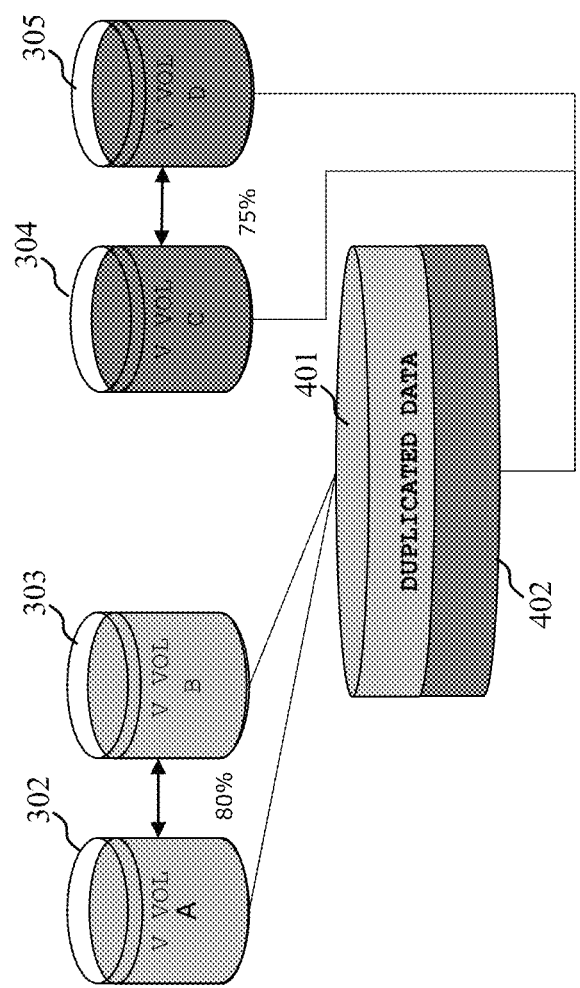
FIG. 4 is an explanatory diagram of a duplication rate according to the embodiment.

FIG. 4 is an explanatory diagram of the duplication rate according to the embodiment.

The duplicated data retention rate of the virtual volume is called the duplication rate. That is, the duplication rate is the retention rate of the duplicated data between virtual volumes on the basis of the duplicated data. In the example of FIG. 4, the virtual volume A 302 and the virtual volume B 303 have a duplicated data 401, and the data amount of this duplicated data 401 can be obtained as an occupation rate of the capacities of the virtual volumes A and B. In the case of FIG. 4, the data amount of the duplicated data 401 indicates that the occupation rate of the capacities of the virtual volumes A and B is 80%, and the duplication rate is 80%. The virtual volume C has a duplicated data 402 between the virtual volumes C and D, which indicates that the rate is 75%.

Returning to FIG. 2, the description will be continued from the SS management unit 1111, the selection processing unit 1112, the I/O processing unit 1113, the path setting unit 1114, and the GUI processing unit 1115.

The SS management unit 1111 manages a continuous scan generation for the virus scanning, creating/discarding of the scan generation, creating/discarding of the SS, and a difference amount of each SS between the generations.

The selection processing unit 1112 performs grouping of the scan groups from the scan generations, selects a virtual volume having a large difference amount between the generations from each scan group as a representative, and performs replication as a representative virtual volume.

The I/O processing unit 1113 processes I/O commands from the physical server 40 and executes control of writing a data to the storage device (volume) and a deduplication process.

The path setting unit 1114 performs a process of attaching and unmounting the virtual volume provided by the storage system 10 to the physical server 40, the virus scanning server 20, and the quarantine server 60.

The GUI processing unit 1115 refers to the data stored in the management information 1116 and performs a process for displaying on the input/output device 112.

In addition, the management information 1116 stored in the memory 111 stores the management information of FIGS. 5 and 6 and FIGS. 8 and 9.

The storage device 115 stores a master virtual volume 1151, a virtual volume 1152, a snapshot 1153, a deduplicated data 1154, snapshot management information T70, and duplicated data management information T100.

The master virtual volume 1151 is a volume that stores a data that is a master of a plurality of virtual volumes.

The virtual volume 1152 is a volume that is created from the master virtual volume 1151 and is provided to the VDI client of each physical server.

The snapshot 1153 is a region for storing a difference data of each generation of the plurality of virtual volumes.

The deduplicated data 1154 is a region for storing a data that is duplicated among the plurality of virtual volumes.

The snapshot management information T70 is information for managing each snapshot, and contents of the information are shown in FIG. 7.

The duplicated data management information T100 is information for managing a duplicated data of the plurality of virtual volumes, and contents of the information are shown in FIG. 10.

<Management Information>

FIG. 5 is a diagram showing an example of storage system management information according to the embodiment.

The storage system management information T50 is stored as the management information 1116 in the memory 111 of the storage system and manages the items of a server 51, a port 52, a virtual volume 53, a snapshot 54, a LUN 55, and a continuous scan generation 56.

The server 51 is information for allowing the storage to recognize a physical server, a virus scanning device, a quarantine server, and the like.

The port 52 is information on the storage-side port for connecting the virtual volume and the physical server.

The virtual volume 53 is virtual volume information which is assigned to the physical server 40 and is registered in the scan system.

The snapshot 54 is information (FIG. 7) related to the snapshot acquired from the virtual volume.

The LUN 55 is information on the path assigned between the volume and the physical server.

The continuous scan generation 56 is information on a group which continuously creates generations and performs scanning for a group of virtual volumes replicated from one master virtual volume.

As the value of each item, for example, the values shown in FIG. 5 are managed.

FIG. 6 is a diagram showing an example of continuous scan generation management information according to the embodiment.

The continuous scan generation management information T60 is stored in the memory 111 of the storage system as management information 1116 and manages the following items. The items are an ID 61, a master virtual volume 62, a scan target volume list 63, the number of VDIs 64, a generation interval 65, the maximum number of retained generations 66, a virus scanning server 67, a quarantine server 68, the number of virus scanning devices 69, a virus scanning time 610, a scan generation 611, a scan group 612, a reference duplication rate 613, and a warning duplication rate threshold value 614.

The ID 61 is unique identification information of the continuous scan generation management information. This is information for identifying the continuous scan generation 310 in FIG. 3.

The master virtual volume 62 is information on the volume in which an OS image of the VDI client that is a replication source is stored.

The scan target volume list 63 is information on a list of volumes (VMs) that become scan targets.

The number of VDIs 64 is the number of VDIs provided by the physical server 40 and is information on the number of virtual volumes attached to the physical server 40.

The generation interval 65 indicates an interval at which a snapshot is acquired and virus scanning is performed on each virtual volume. In addition, the generation interval indicates the shortest recoverable interval.

The maximum number of retained generations 66 is the number of generations for which the snapshot is retained, and it is possible to recover by going back by this value and the generation interval (for example, maximum 1024).

The virus scanning server 67 is information on a server set for the virus scanning.

The quarantine server 68 is information on a server set for the server.

The number of virus scanning devices 69 is the number of devices used for the virus scanning. As the number of devices increases, the number that can be scanned in each generation increases, and thus, the detection accuracy improves.

The virus scanning time 610 is the time required in a case where the VDI is scanned with antivirus software. Any antivirus software may be used as long as the antivirus can be used.

The scan generation 611 is information on a generation that is created at each generation interval and retains the plurality of scan groups and is information as shown in FIG. 8.

The scan group 612 is information where the plurality of scan groups are created for each scan generation and information about a group of volume grouped in the volume selection process of the scan target.

The reference duplication rate 613 is a reference value of the duplication rate for grouping. The reference value is used as an initial value.

The warning duplication rate threshold value 614 is a threshold value for displaying a warning in a case where the grouped duplication rate is lower than the user's assumption.

As the value of each item, for example, the values shown in FIG. 6 are managed.

FIG. 7 is a diagram showing an example of snapshot management information according to the embodiment.

The snapshot management information T70 is stored in the storage device 115 of the storage system and manages the following items. The items are an ID 71, a creation source volume ID 72, a creation date/time 73, difference information 74, and a difference amount 75.

The ID 71 is unique identification information that identifies the snapshot.

The creation source volume ID 72 is the volume ID of the creation source of the snapshot.

The creation date/time 73 is the creation date/time of the snapshot.

The difference information 74 is difference information from the time when the snapshot is created until the next snapshot is created.

The difference amount 75 is the difference amount in the snapshot of each generation.

The snapshot is a logical existence created on the memory of the storage system. The entity of the data is in the data region, and the data region is referred to via the snapshot. When writing is performed to the data region of the VDI client, the originally existing data is retracted in the retraction region which is invisible to the user. The amount of the retracted data becomes the difference amount 75, and the information for referring to the retracted data becomes the difference information 74.

In addition, the snapshot management information T70 is managed for each snapshot.

As the value of each item, for example, the values shown in FIG. 7 are managed.

FIG. 8 is a diagram showing an example of scan generation management information according to the embodiment.

The scan generation management information T80 is stored as management information 1116 in the memory 111 of the storage system and manages the following items. The items are an ID 81, a creation time 82, a scan started time 83, a scan finished time 84, the number of groups 85, a group list 86, a grouping duplication rate 87, and a status 88.

The ID 81 is identification information that identifies the scan generation.

The creation time 82 is time information when the generation was created.

The scan started time 83 is time information when the scan of this generation was started.

The scan finished time 84 is time information when the scan of this generation has been completed.

The number of groups 85 is information related to the number (maximum value) of groups grouped in this generation.

The group list 86 is information on group IDs grouped in this generation.

The grouping duplication rate 87 is a threshold value of the duplication rate grouped in this generation.

The status 88 indicates the situation of this generation, and indicates the state such as scan unexecuted, unmounted (infected), recovered, and warning.

As the value of each item, for example, the values shown in FIG. 8 are managed.

FIG. 9 is a diagram showing an example of scan group management information according to the embodiment.

The scan group management information T90 is stored as management information 1116 in the memory 111 of the storage system and manages the following items. The items are an ID 91, a group status 92, a belonging volume list 93, a difference amount of each volume 94, and a state of each volume 95.

The ID 91 is information for identifying the scan group.

The group status 92 indicates the state of the scan group, and indicates the state such as scan unexecuted, scan being executed, unmounted (infected), and recovered.

The belonging volume list 93 is a list of virtual volumes belonging to a group.

The difference amount of each volume 94 is the difference amount of each virtual volume of the snapshot when the group is created. The difference amount is managed for each ID for identifying each virtual volume.

The state of each volume 95 indicates the state of the virtual volume and indicates a state such as unscanned, normal, infected, and recovered. The state of each volume 95 is also managed for each ID for identifying each virtual volume.

As the value of each item, for example, the values shown in FIG. 9 are managed.

FIG. 10 is a diagram showing an example of duplicated data management information according to the embodiment.

The duplicated data management information T100 is stored in the storage device 115 of the storage system and manages the following items. These items are, for example, data 1013, virtual VOL A 1014, virtual VOL B 1015, virtual VOL C 1016, and virtual VOL D 1017.

The data 1013 is data that is duplicated between virtual volumes.

The virtual VOL A 1014, the virtual VOL B 1015, the virtual VOL C 1016, and the virtual VOL D 1017 constitute a continuous scan generation and include information on whether or not duplicated data is stored in each virtual volume.

The difference amount may be managed by using each address of each virtual volume as a pointer indicating a retraction region.

In the example of FIG. 10, it is indicated that data "1001" is stored in the virtual volume A and the virtual volume B.

The duplication rate is obtained on the basis of the information of the duplicated data management information T100. The duplication rate can be recognized as follows.

Duplication rate=total amount of duplicated data between virtual volumes/capacity of virtual volume For example, the duplication rate becomes the total amount of duplicated data of the virtual volume A and the virtual volume B/the capacity of the virtual volume A.

<Process flow>

Figure 11:
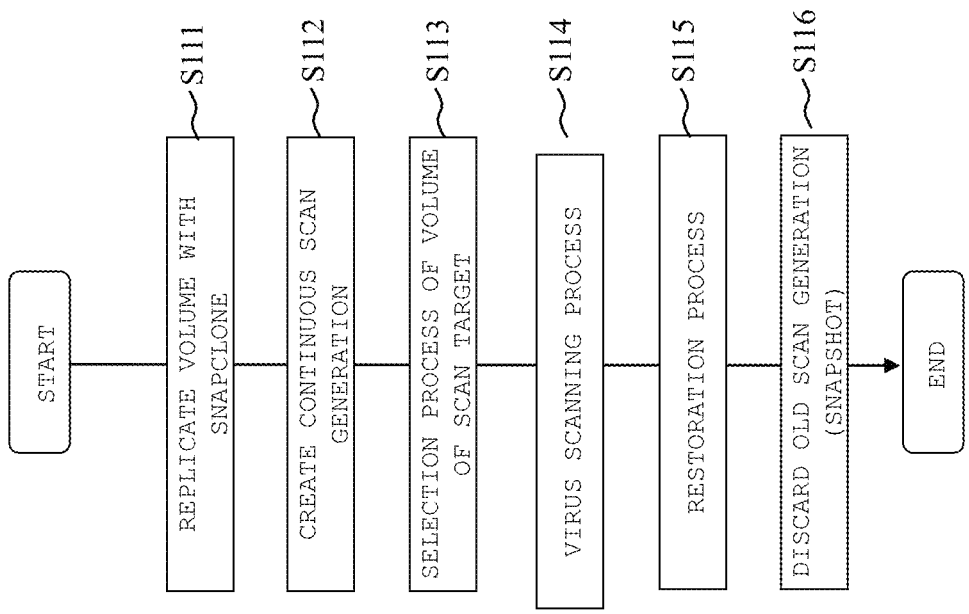
FIG. 11 is a diagram illustrating an example of a basic operation flow according to the embodiment.

FIG. 11 is a diagram illustrating an example of a basic operation flow according to the embodiment.

When the process of the embodiment is started, the SS management unit 1111 replicates the master virtual volume 301 with a snapclone to create a plurality of virtual volumes (S111).

In step S112, the SS management unit 1111 creates the continuous scan generation 310 for the plurality of virtual volumes created in S111. The information of the created continuous scan generation is registered in the continuous scan generation management information T60. The continuous scan generation 310 sets the virtual volumes, which are associated with the same pool in which the deduplication function is set, as a target.

In step S113, the selection processing unit 1112 selects the scan target volume as a representative.

In step S114, the virus scanning unit 22 executes the virus scanning of the representative virtual volume which is selected in step S113 and replicated by the SS management unit 1111. The execution result is registered in the status 88 of the scan generation management information T80 and the state of each volume 95 of the scan group management information T90.

In step S115, the SS management unit 1111 performs a restoration process of the virtual volume infected with virus. In the restoration process, for example, by using the snapshot before infection, the virtual volume is restored to the image at the time of not being watched in the past.

In step S116, the SS management unit 1111 discards the snapshot of the old scan generation. This is because a snapshot older than the snapshot used at the time of restoration is not necessary for restoring the virtual volume. Of course, assuming that an old snapshot is necessary in the case of performing data analysis at that time, the old snapshot may be retained without being discarded. In that case, the execution time of step S116 may not necessarily be subsequent to the restoration process.

Figure 12:
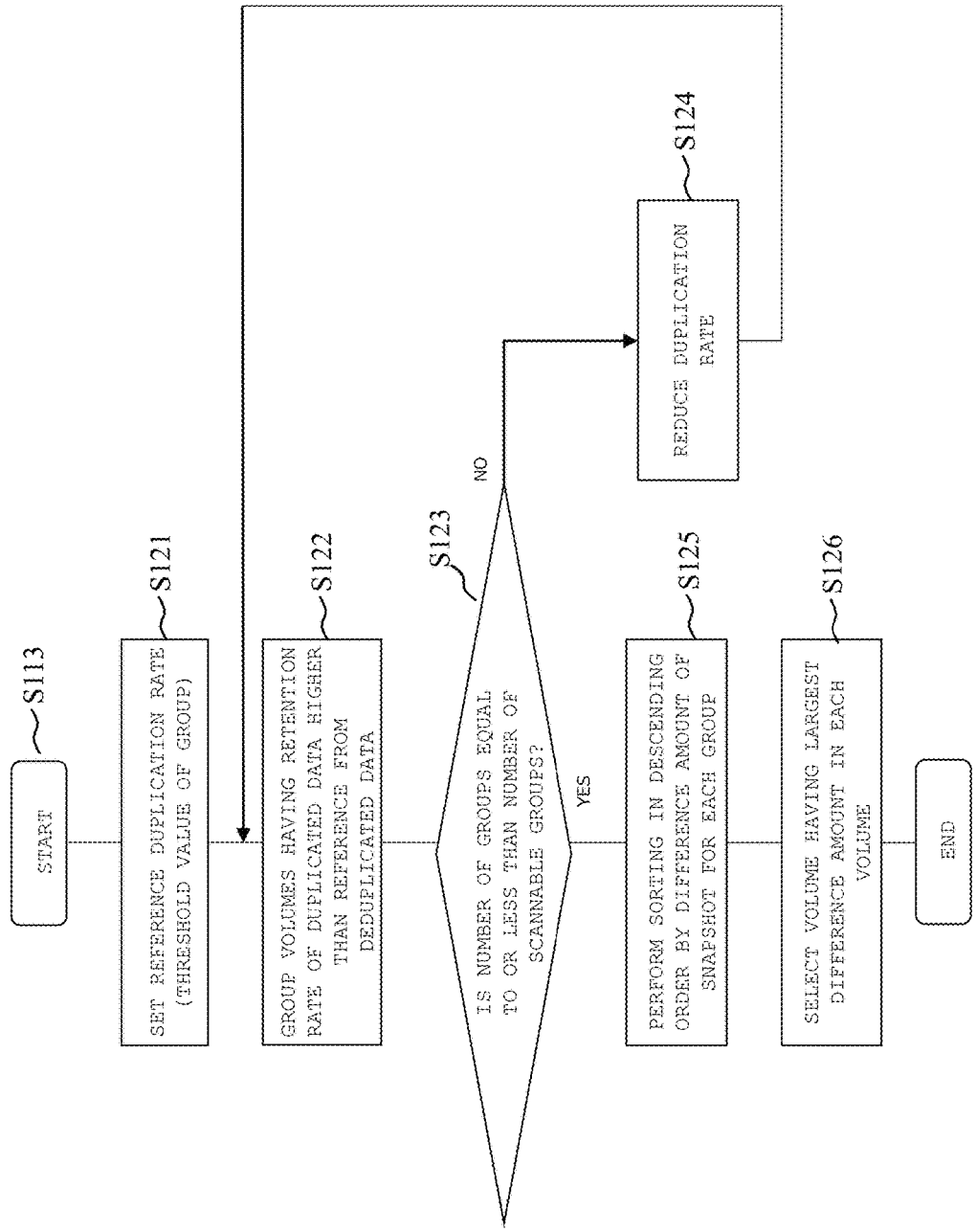
FIG. 12 is a diagram illustrating an example of a scan target volume selection process flow according to the embodiment.

FIG. 12 is a diagram illustrating an example of a scan target volume selection process flow according to the embodiment. The selection process flow of FIG. 12 is details of the process of step S113 of FIG. 11 and is executed by the selection processing unit 1112.

When the process is started, in step S121, a reference duplication rate is set and registered in the reference duplication rate 613 of the continuous scan generation management information T60.

If the volumes having the set duplication rate or more are grouped, the set duplication rate becomes high. In this case, the number of volumes to be grouped is small, and the number of groups is large (the number of volumes of scan targets is increased).

On the other hand, in a case where the duplication rate to be set is low, the number of volumes to be grouped is large, and the number of groups is small (the number of volumes of scan targets is decreased).

Therefore, the grouping is started from a high duplication rate, and the number of groups is dynamically adjusted until the number of groups becomes the number of scannable groups or less.

Next, in step S122, virtual volumes having a duplication rate in which the retention rate of the duplicated data is higher than the reference duplication rate are grouped from the deduplicated data.

The reference duplication rate is initially set by the user and set in the continuous scan generation management information T60. This is a process corresponding to the first step in FIG. 3.

Next, in step S123, it is determined whether the number of groups is equal to or less than the number of scannable groups registered in the number of groups 85 of the scan generation management information T80. In the following cases, the process proceeds to step S125, and if not, the process proceeds to step S124.

The "number of scannable groups" is calculated from the following three items which are user input values.

(1) Time required for the virus scanning
(2) Generation management interval
(3) Number of virus scanning devices For example, in the case of
Time required for the virus scanning=2 hours
Generation management interval=12 hours, and
Number of virus scanning devices=10,
the number of scannable groups in one generation is 12/2×10=60.

The time required for the virus scanning in (1) described above is information on the virus scanning time 610 in the continuous scan generation management information T60, the generation management interval in (2) is information on the generation interval 65, and the number of virus scanning devices in (3) is information on the number of virus scanning devices 69.

The user adjusts these input values on the basis of the number of VDIs (volumes) to be provided and the grouping threshold value of the previous generation, which are user input values (operating environment).

In step S124, the duplication rate as a reference is reduced, and the process returns to step S122. As a result, the number of virtual volumes constituting the scan group can be set appropriately.

In this step, the scan efficiency and the detection rate can be improved by scaling out the virus scanning server in accordance with, for example, customer's infrastructure requirements. In addition, by setting a grouping warning threshold value, it is possible to detect a case where the efficiency is not more effectively working than the expected value and notify the user, so that it becomes possible to notify the occasion where improvement of scan efficiency is to be planned by scaling out.

In step S125, in the scan groups, sorting is performed in descending order by difference amount of the snapshot. That is, in a case where a plurality of virtual volumes belong to the scan group, sorting is performed in descending order of the difference between the generations. This is a process corresponding to the process of the second step in FIG. 3 and is performed on the basis of the difference amount 75 of the snapshot management information T70.

Finally, in step S126, the virtual volume having the largest difference amount is selected as a representative. This is a process corresponding to the third step in FIG. 3. The process is performed on the basis of the difference amount 75 of the snapshot management information T70.

Figure 13:
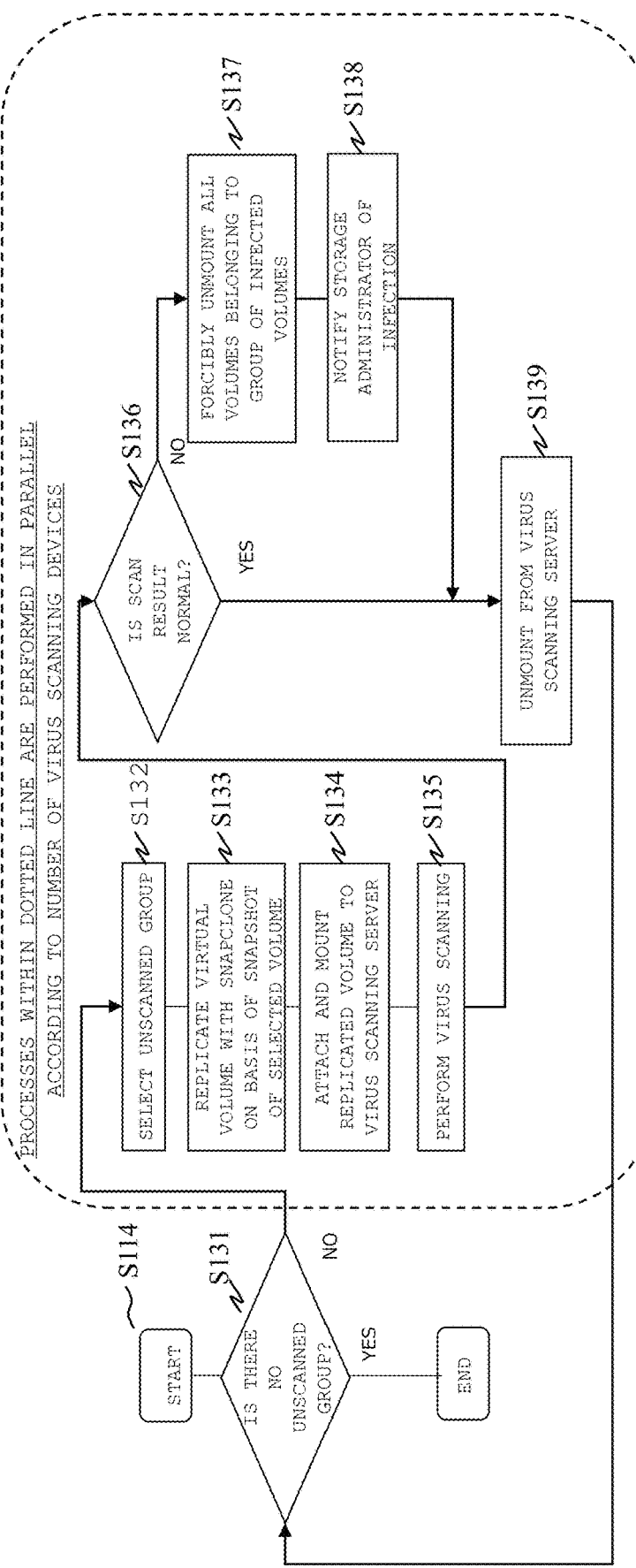
FIG. 13 is a diagram illustrating an example of a virus scanning process flow according to the embodiment.

FIG. 13 is a diagram illustrating an example of a virus scanning process flow according to the embodiment.

The virus scanning process flow of FIG. 13 is details of the process of step S114 of FIG. 11.

When the process is started, in step S131, the selection processing unit 1112 determines whether or not there is an unscanned scan group on the basis of the scan group management information T90. If there is no unscanned scan group, the process ends; and if there is an unscanned scan group, the process proceeds to step S132.

In step S132, the selection processing unit 1112 refers to the status 88 of the scan generation management information T80 and selects an unscanned scan group. In the example of FIG. 3, in a case where the scan group 1 (361) is unscanned, the scan group 1 is selected.

In step S133, the SS management unit 1111 replicates the virtual volume with the snapclone on the basis of the snapshot of the volume selected from the unscanned scan group and sets the replicated virtual volume as the representative virtual volume. In FIG. 3, the representative virtual volume that is a replica of the virtual volume B is created from the virtual volume B of the scan group 1 (361) and the difference data B-1 of the snapshot.

In step S134, the path setting unit 1114 attaches the replicated volume (representative virtual volume) to the virus scanning server 20 and mounts the replicated volume. That is, the replica of the virtual volume belonging to the scan group other than the selected virtual volume is not attached to the virus scanning server. Therefore, it is possible to improve the efficiency of virus scanning.

In step S135, the virus scanning unit 22 of the virus scanning server 20 performs virus scanning of the representative virtual volume. The result is registered in the status 88 of the scan generation management information T80.

In step S136, the SS management unit 1111 refers to the scan group management information T90 and determines whether the scan result is normal, that is, whether or not to be infected with virus. If not infected, the process proceeds to step S139, and if infected, the process proceeds to step S137.

In step S137, the path setting unit 1114 forcibly unmounts all the virtual volumes belonging to the scan group to which the infected representative virtual volume belongs from the physical server 40. This is a process corresponding to the fourth step in FIG. 3. In the case of FIG. 3, when the representative virtual volume B is infected, the virtual volumes A and D belonging to the same scan group are also unmounted from the physical server 40.

In step S138, the GUI processing unit 1115 is displayed on the display device (not illustrated) of the input/output device 112 to notify the storage administrator of the infection.

In step S139, the path setting unit 1114 unmounts the representative virtual volume attached in step S134 from the virus scanning server 20 and the process returns to step S131.

Figure 14:
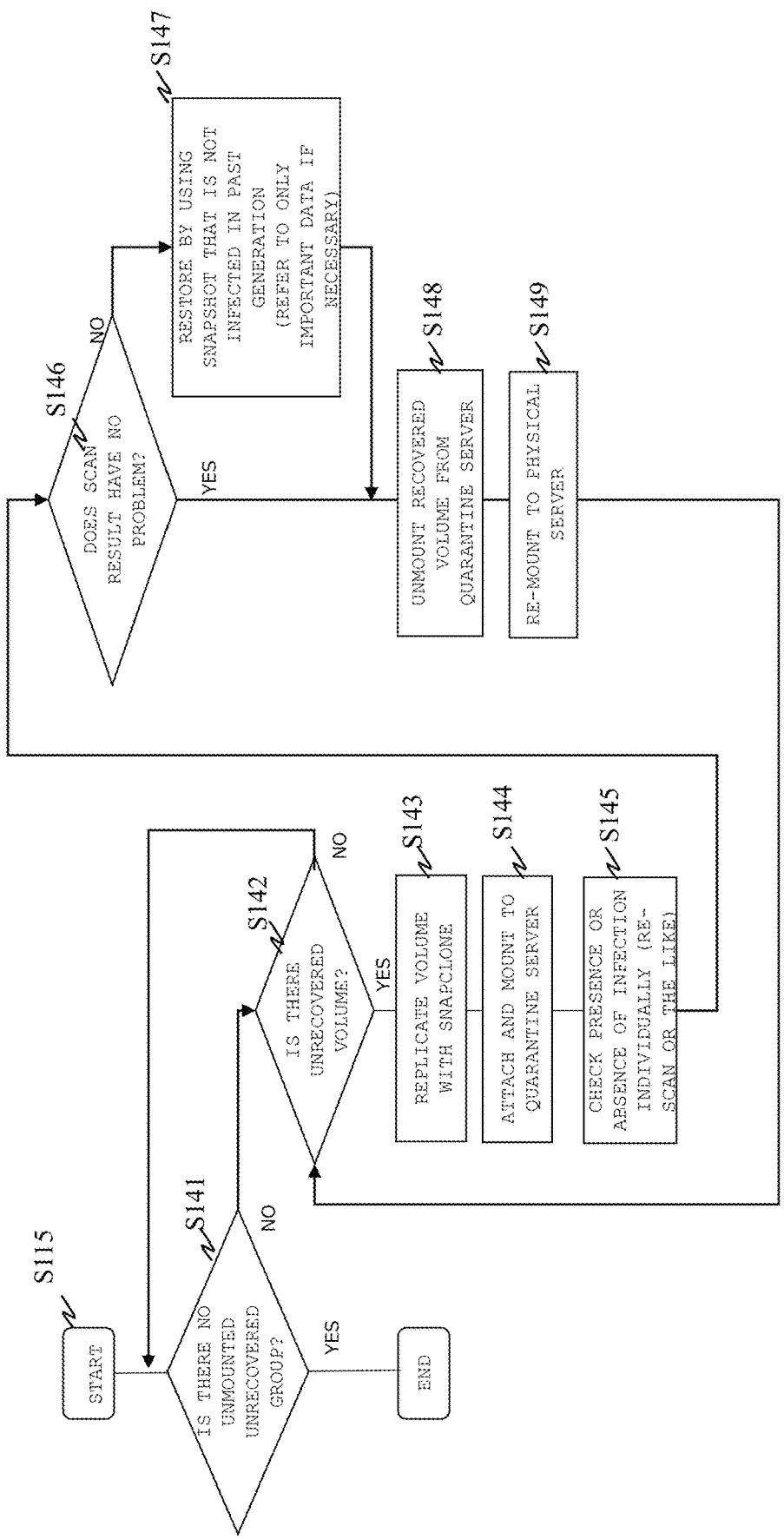
FIG. 14 is a diagram illustrating an example of a restoration process flow according to the embodiment.

FIG. 14 is a diagram illustrating an example of a restoration process flow according to the embodiment. The restoration process flow of FIG. 14 is the details of the process of step S115 of FIG. 11.

When the process is started, in step S141, the SS management unit 1111 determines whether or not there is an unmounted unrecovered scan group on the basis of the scan group management information T90. If there is no unmounted unrecovered scan group, the process ends; and if there is an unmounted unrecovered scan group, the process proceeds to step S142.

In step S142, the SS management unit 1111 determines whether or not there is an unrecovered virtual volume in the scan group on the basis of the scan group management information T90. If there is an unrecovered virtual volume, the process proceeds to step S143, and if there is no unrecovered virtual volume, the process proceeds to step S146.

In step S143, the SS management unit 1111 creates a replica of the virtual volume that has not been recovered in step S142.

In step S144, the path setting unit 1114 attaches and mounts the replicated virtual volume with respect to the quarantine server 60.

In step S145, the quarantine server 60 executes virus scanning on the replica of each virtual volume, checks the infection of each volume, and registers the state of each volume in the state of each volume 95 of the scan group management information T90.

In step S146, the SS management unit 1111 determines, on the basis of the scan group management information T90, whether or not the scan result has a problem. If there is no problem, the process proceeds to step S148; and if there is a problem, the process proceeds to step S147.

In step S147, the restoration processing unit of the quarantine server 60 restores the virtual volume in which the infection is found by using the uninfected snapshots of the past generations.

In step S148, the path setting unit 1114 unmounts the recovered virtual volume from the quarantine server 60.

In step S149, the path setting unit 1114 mounts the recovered virtual volume on the physical server 40.

The process of FIG. 14 corresponds to the fifth step of FIG. 3.

<Display Screen>

Figure 15:
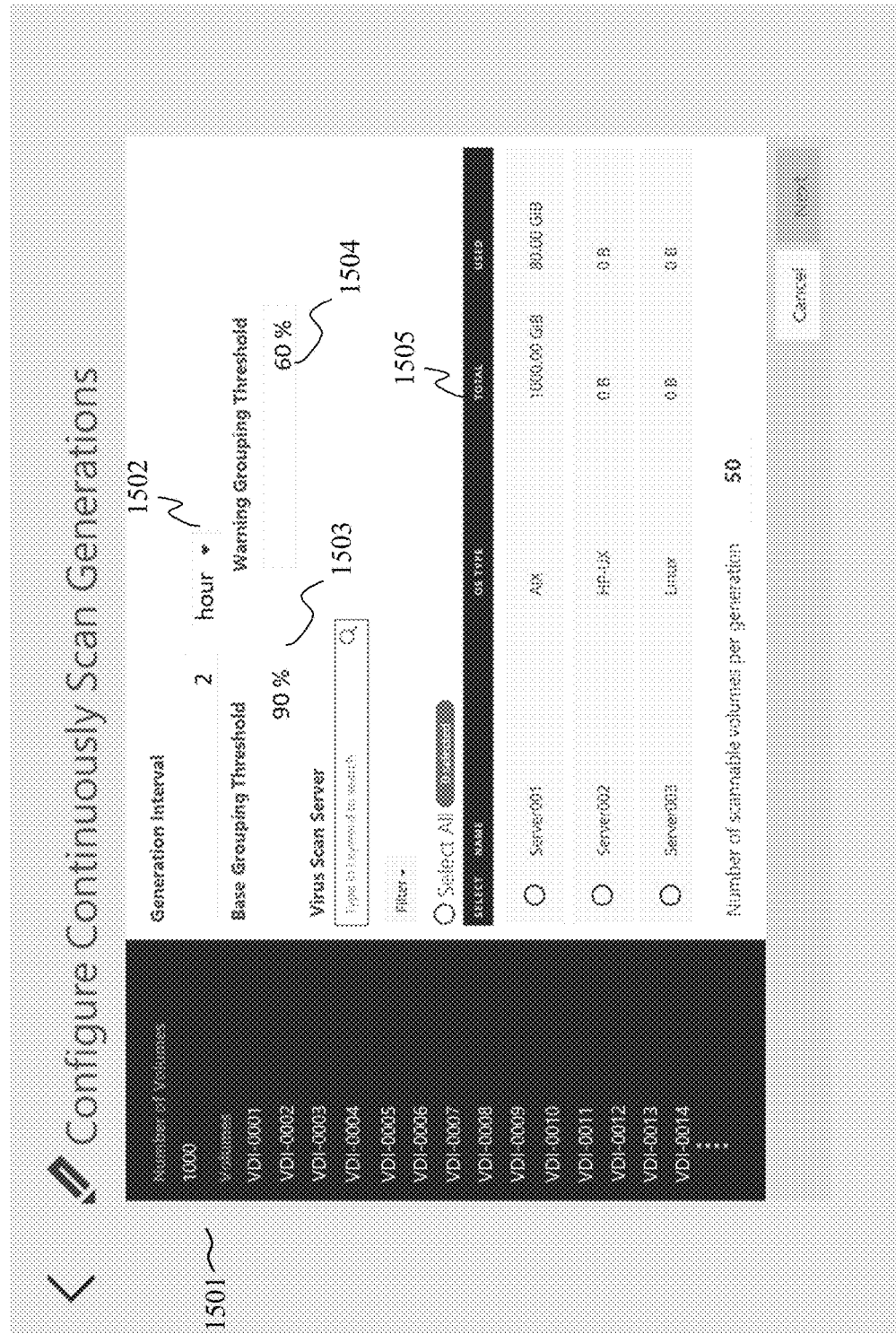
FIG. 15 is a diagram illustrating an example of a continuous scan generation management information setting screen according to the embodiment.

FIG. 15 is a diagram illustrating an example of a continuous scan generation management information setting screen according to the embodiment. FIG. 15 is a reference example of the information in FIG. 6.

A scan generation generation interval 1502, a duplication rate reference value 1503, and a warning value 1504 can be input. A VDI list 1501 and a scan server setting status 1505 are also displayed at the same time.

The user selects the master virtual volume, selects the number to be replicated, and sets the continuous scan generation management information illustrated in FIG. 15.

FIG. 16 is a diagram illustrating an example of a management screen displaying a scan generation list according to the embodiment.

An example of a display screen that displays one generation of the scan generation is illustrated, and a snapshot creation time 1601 of each virtual volume belonging to the scan generation, a status 1602 of the scan generation, the number of groups 1603 belonging to the scan generation, and a threshold value 1604 of a duplication rate for grouping are displayed. With respect to the status 1602 indicates, for example, that the grouping is performed with the grouping warning threshold value or more set by the user, as a status, such as "Warning", and encourages the consideration of the increase in the number of virus scanning devices.

Figure 17:
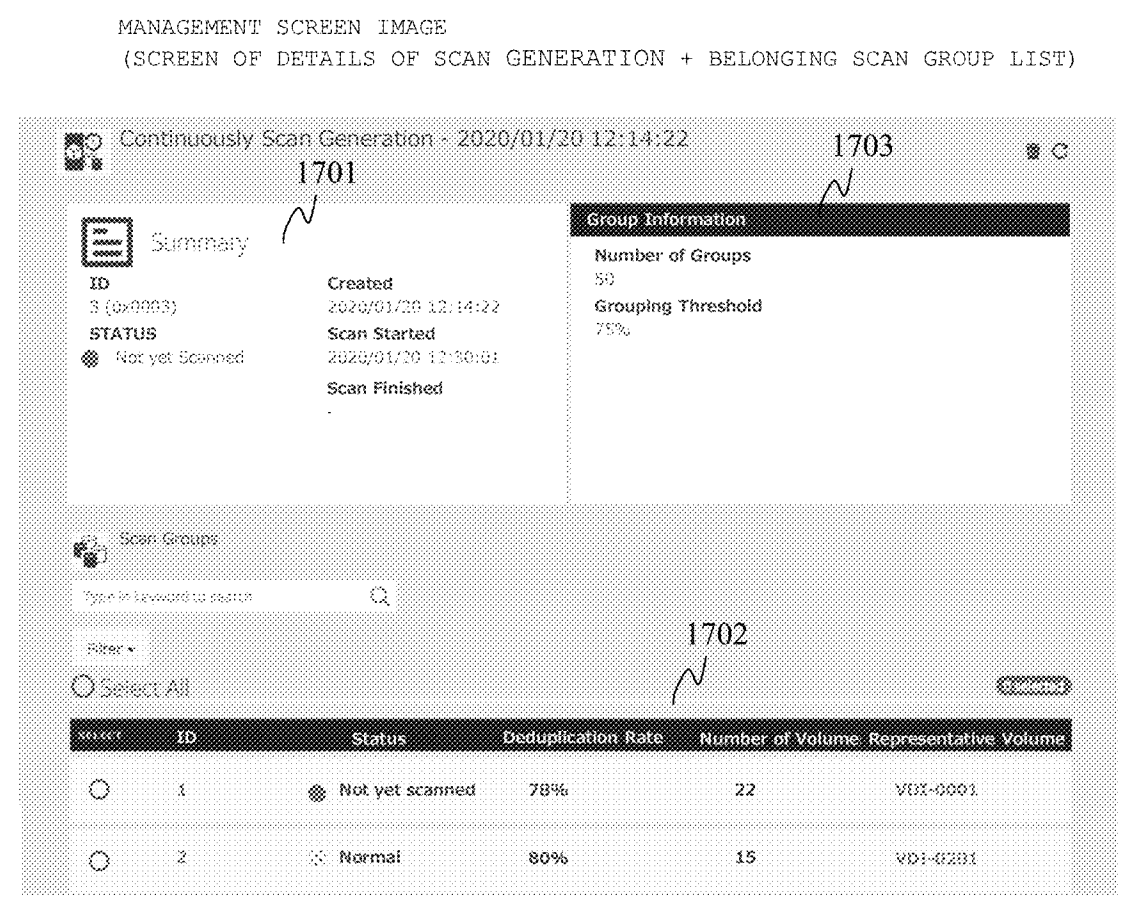

FIG. 17 is a diagram illustrating an example of a management screen displaying detailed scan generation information according to the embodiment. FIG. 17 is a reference example of the information in FIG. 8.

A scan generation summary 1701, a scan group list 1702, and group information 1703 are displayed.

The scan generation summary 1701 includes a scan generation ID, a scan status, an execution time, a time when a generation (snapshot) was created, a scan started time, and a scan finished time. In the scan group list 1702, information on groups belonging to this generation is displayed. For example, the status of the scan generation, the duplicated data retention rate in each group, the number of belonging volumes, the name of the representative volume (volume of the scan target), and the transition destination are included. The group information 1703 includes the number of groups and a grouping threshold value related to grouping.

Figure 18:
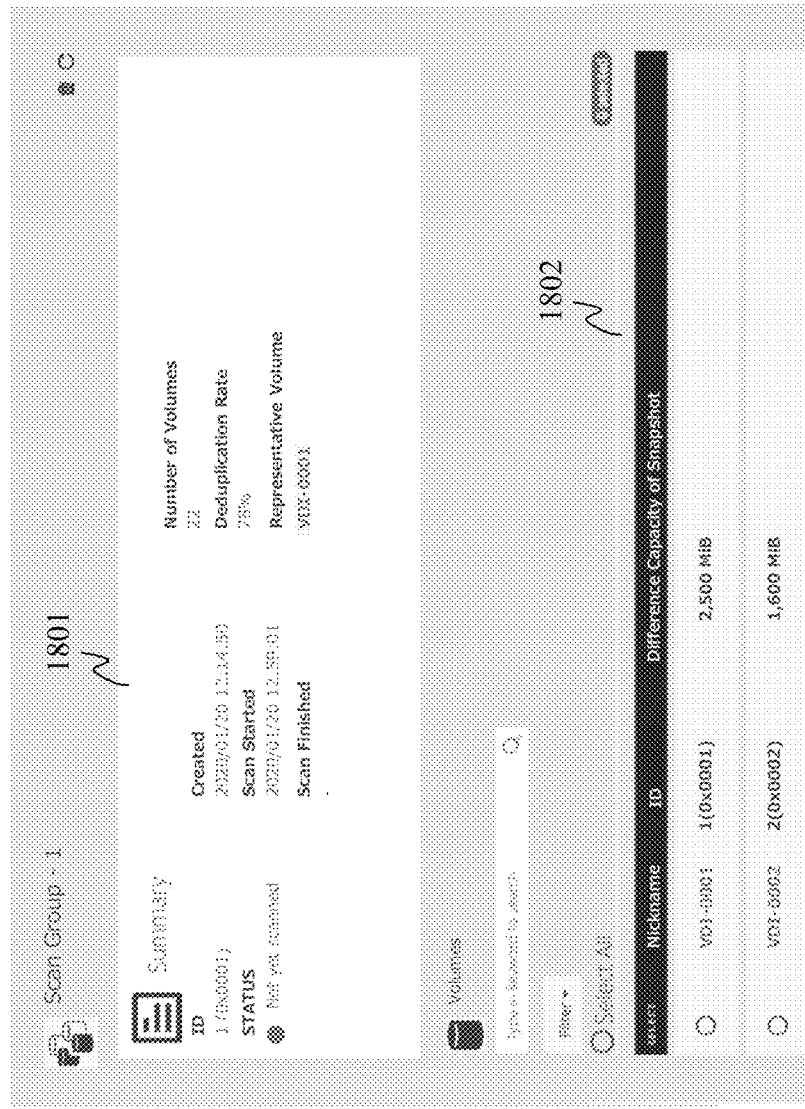
FIG. 18 is a diagram illustrating an example of a management screen displaying detailed scan group information according to the embodiment.

FIG. 18 is a diagram illustrating an example of a management screen displaying detailed scan group information according to the embodiment. FIG. 18 is a reference example of the information of FIG. 9. A summary 1801 that is detailed information of the scan group and a list 1802 of belonging volumes is displayed.

As described above, according to the storage system of the embodiment, in a case where a certain volume is infected, it is possible to prevent spread of infection by collectively unmounting volumes having high similar infection risk.

In addition, according to the storage system of the embodiment, in a case where a large number of volumes exist, it becomes possible to efficiently execute virus scanning from a volume having a high infection risk.

In addition, according to the storage system of the embodiment, the scan efficiency and the detection rate can be improved by scaling out the virus scanning server in accordance with customer's infrastructure requirements.

In addition, by setting the grouping warning threshold value in accordance with the requirements, it is possible to detect a case where the efficiency is not more effectively working than the expected value, that is, it is possible to notify the occasion where improvement of scan efficiency is to be planned by scaling out.

Furthermore, the present invention is not limited to the above-described embodiments, but various modifications may be included. In addition, the above-described embodiments have been described in detail in order to describe the present invention in an easy-to-understand manner, and thus, the present invention is not necessarily limited to those having all the configurations described. In addition, a portion of the configuration of a certain embodiment can be swapped with the configuration of another embodiment, and the configuration of another embodiment can be added to the configuration of a certain embodiment. In addition, with respect to a portion of the configuration of each embodiment, other configurations can be added, deleted, and/or replaced. In addition, each of the above-described configurations, functions, processing units, processing means, and the like may be realized in hardware by, for example, designing a portion or all of the configurations, functions, processing units, processing means, and the like with, for example, an integrated circuit. In addition, each of the above-described configurations, functions, and the like may be realized by software by allowing a processor to interpret and execute a program that realizes each function.

Information of a program, a table, a file, or the like that realizes each function may be stored in a memory, a recording device such as a hard disk or an SSD, or a recording medium such as an IC card, an SD card, or a DVD. In addition, control lines and information lines are illustrated as being considered to be necessary for description, and not all the control lines and information lines in a product are not necessarily illustrated. In practice, it may be considered that almost all configurations are connected to each other.

What is claimed is:

1. A storage system in which a plurality of virtual volumes obtained by replicating a master virtual volume are provided to each of a plurality of virtual machines of a physical server, respectively, the storage system comprising:
 a first processor coupled to a first memory;
 a second processor coupled to a second memory,
 wherein the first memory stores instructions that when executed by the first processor configure the first processor to:
 configure a continuous scan generation from the plurality of virtual volumes, the continuous scan generation including a first generation which includes respective difference amounts for each of the plurality of virtual volumes in a zeroth generation, and the plurality of virtual volumes storing duplicated data that is duplicated and stored between the plurality of virtual volumes,
 select one or more of the virtual volumes to be placed into at least two different scan groups based on a duplication rate of the plurality of virtual volumes included in the continuous scan generation, the duplication rate indicating the retention rate of the duplicated data between the virtual volumes,
 create replicas for the respective virtual volumes having the greatest difference amounts for each of the at least two different scan groups,
 wherein the second memory stores instructions that when executed by the second processor configure the second processor to:
 scan the created replicas for viruses, and
 wherein the first memory stores instructions that when executed by the first processor configure the first processor to, upon determining at least one of the replicas is infected with a virus, unmount the virtual volumes belonging to the scan group of the at least one replica from the physical server.

2. The storage system according to claim 1, wherein the first processor is configured to: set an occupation rate of data that are duplicated between the plurality of virtual volumes belonging to the continuous scan generation to the capacity of the virtual volume as the duplication rate and group the virtual volumes having a higher duplication rate than a reference duplication rate.

3. The storage system according to claim 2,
wherein the first processor is configured to:
create snapshots of a plurality of generations for the plurality of virtual volumes included in the continuous scan generation, and manages a difference between the generations between the snapshots of the plurality of generations for each of the plurality of virtual volumes as the respective difference amounts,
select the virtual volume having a large difference between the generations as a representative in a case where the plurality of virtual volumes belong to the scan group, and
attach the replicas to a virus scanning server which includes the second processor and the second memory.

4. The storage system according to claim 3, wherein the first processor is configured to not attach the replica of any of the virtual volume that belongs to a scan group other than the selected virtual volume to the virus scanning server.

5. The storage system according to claim 3, wherein the first processor is configured to perform grouping by using a value obtained by reducing the reference duplication rate in a case where the number of scan groups exceeds the number of scannable groups.

6. A computer system having a physical server that configures a plurality of virtual machines, a storage system that provides a virtual volume obtained by replicating a master virtual volume to the physical server, a virus scanning server that executes virus scanning of the virtual volume, and a quarantine server that restores a data of the virtual volume,
the storage system comprising:
a first processor coupled to a first memory, the first memory stores instructions that when executed by the first processor configure the first processor to:
configure a continuous scan generation from the plurality of virtual volumes, the continuous scan generation including a first generation which includes respective difference amounts for each of the plurality of virtual volumes in a zeroth generation, and the plurality of virtual volumes storing duplicated data that is duplicated and stored between the plurality of virtual volumes,
select one or more of the virtual volumes to be placed into at least two different scan groups based on a data duplication rate of the plurality of virtual volumes included in the continuous scan generation, the data duplication rate indicating the retention rate of the duplicated data between the virtual volumes,
create replicas for the respective virtual volumes having the greatest difference amounts for each of the at least two different scan groups,
attach the replicas of the virtual volumes to the virus scanning server,
wherein the virus scanning server executes virus scanning of the attached replicas, and
wherein the first memory stores instructions that when executed by the first processor configure the first processor to upon determining at least one of the replicas is infected with a virus, unmount the virtual volumes belonging to the scan group of the at least one replica from the physical server.

7. The computer system according to claim 6, wherein the first processor is configured to: set an occupation rate of data that are duplicated between the plurality of virtual volumes belonging to the continuous scan generation to the capacity of the virtual volume as the data duplication rate and group the virtual volumes having a higher data duplication rate than a reference duplication rate.

8. The computer system according to claim 7,
wherein the first processor is configured to:
create snapshots of a plurality of generations for the plurality of virtual volumes included in the continuous scan generation, and manages a difference between the generations between the snapshots of the plurality of generations for each of the plurality of virtual volumes as the respective difference amounts, and
select the virtual volume having a large difference between the generations as a representative in a case where the plurality of virtual volumes belong to the scan group.

9. The computer system according to claim 8, wherein the first processor is configured to perform grouping by using a value obtained by reducing the reference duplication rate in a case where the number of scan groups exceeds the number of scannable groups.

* * * * *